March 20, 1934.  A. A. KOPF  1,951,363
BRAKE DRUM
Filed Sept. 28, 1932   3 Sheets-Sheet 1

Arthur A. Kopf,
INVENTOR

BY Victor J. Evans & Co.
ATTORNEY

WITNESS: P. J. Hickey

March 20, 1934.  A. A. KOPF  1,951,363
BRAKE DRUM
Filed Sept. 28, 1932   3 Sheets-Sheet 2

Arthur A. Kopf,
INVENTOR
BY Victor J. Evans & Co.
ATTORNEY

P. J. Hickey
WITNESS:

March 20, 1934.  A. A. KOPF  1,951,363
BRAKE DRUM
Filed Sept. 28, 1932  3 Sheets-Sheet 3
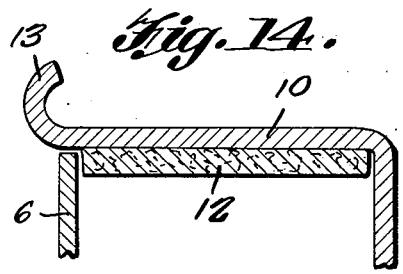
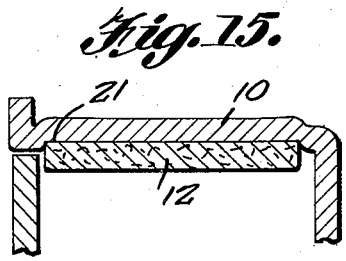
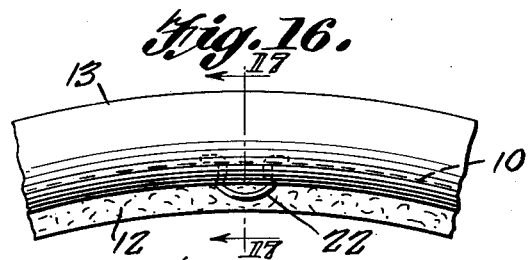
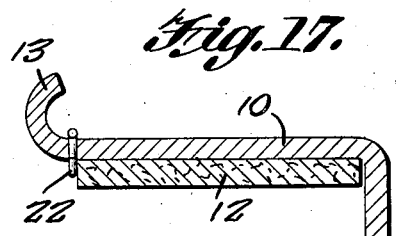
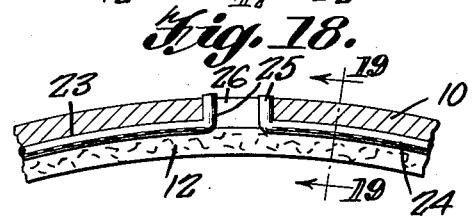
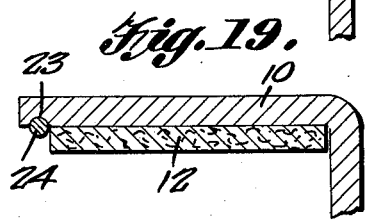
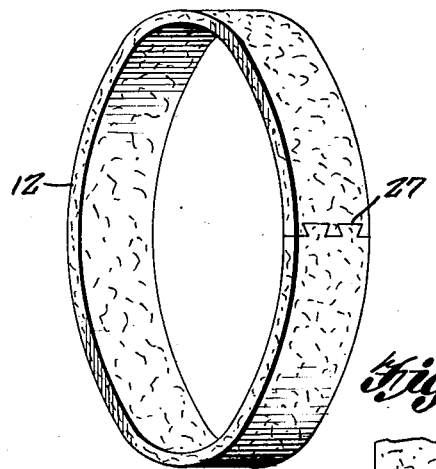
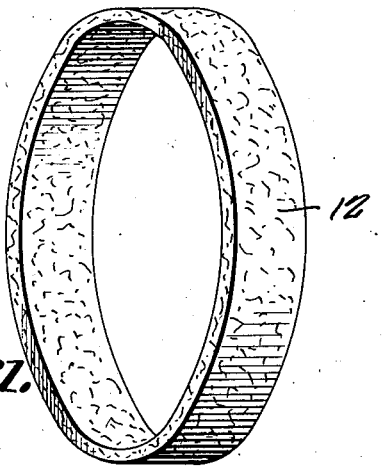
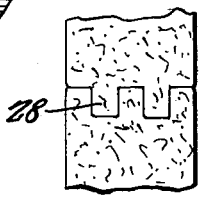
Arthur A. Kopf, INVENTOR
BY Victor J. Evans & Co.
ATTORNEY
WITNESS:

Patented Mar. 20, 1934

UNITED STATES PATENT OFFICE 1,951,363

BRAKE DRUM

Arthur A. Kopf, Ancon, Canal Zone, assignor of one-half to Samuel Grier, Balboa Heights, Canal Zone Application September 28, 1932, Serial No. 635,287

2 Claims. (Cl. 188—218)

This invention relates to brake drums for motor vehicles and has for the primary object, the provision of means to render a saving in time and expense in the servicing of brakes and obviates the customary practice of removing the axle bearings and associated parts in order that the brakes may be serviced or relined.

Another object of this invention is the provision of a drum readily detachable from a wheel and having means to removably secure thereto a brake lining so that when the brake mechanism needs adjustment or the replacement of the lining is necessary, the operation may be easily and quickly accomplished by simply removing the demountable wheel in the usual manner, exposing all parts which may need attention without removing hubs, bearings, axles and like parts as now customary in motor vehicle construction.

A further object of this invention is the provision of an annular lining so mounted to the drum that its removal may be easily accomplished and when in use will provide a continuous surface for the brake shoes or other brake construction to engage, providing more efficient braking action and increased life to the brake lining, due to the wear thereon being evenly distributed and obviate wearing the lining at certain portions as now occurring in brake construction.

A still further object of this invention is the provision of a drum of the above stated character and the mounting of the lining thereto which provides a heat insulator to prevent heat generated during the application of the brakes from being transmitted to the drum and hub of the wheel and thence to other associated parts, thus obviating overheating of brakes and the destroying of qualities of the lubricant employed for lubricating the axle and wheel bearings.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view illustrating a conventional type of wheel mounted on an axle with a drum and lining constructed in accordance with the present invention.

Figure 14 is a fragmentary transverse sectional view showing the lining retained in position by the brake drum plate carried by the axle construction of the vehicle.

Figure 15 is a fragmentary transverse sectional view showing a construction similar to that disclosed in Figure 14 with the lining positioned within a depression or recess of the drum.

Figure 16 is a fragmentary side elevation illustrating another modified form of means of securing the brake lining to the drum.

Figure 17 is a transverse sectional view taken on the line 17—17 of Figure 16.

Figure 18 is a fragmentary sectional view showing another modified form of means of securing the brake lining to the drum.

Figure 19 is a transverse sectional view taken on the line 19—19 of Figure 18.

Figure 20 is a perspective view illustrating an annular lining constructed from a single length of material with the ends thereof dove-tailed together.

Figure 21 is a fragmentary plan view showing a modified means of connecting the ends of the lining together.

Figure 22 is a perspective view illustrating an annular lining constructed without detachable ends.

Figure 1:
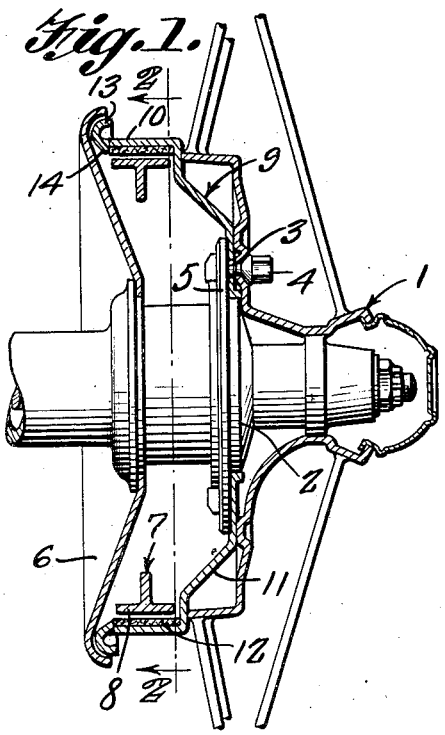
Figure 2:
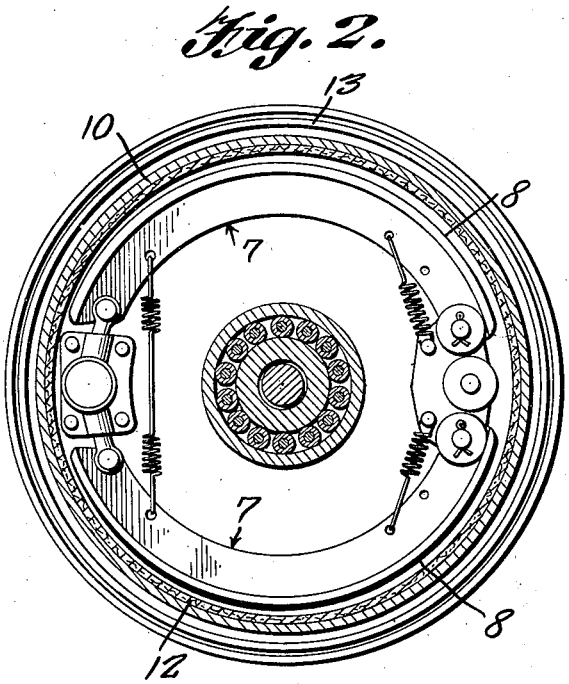
Figure 2 is a sectional view taken on the line 2—2 of Figure 1.
Figure 3:
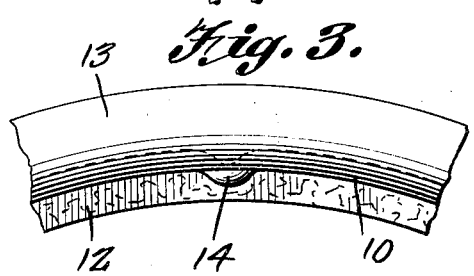
Figure 3 is a fragmentary sectional view showing means of retaining the lining in position with respect to the drum.
Figure 4:
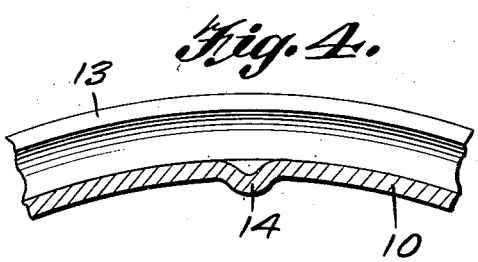
Figure 4 is a similar view with the lining removed.
Figure 5:
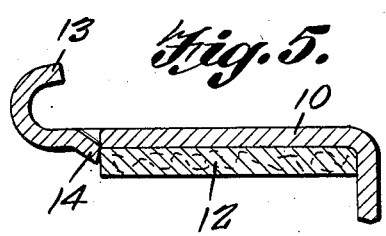
Figure 5 is a fragmentary transverse sectional view showing a modified form of means of mounting the lining to the drum.

Referring in detail to the drawings the numeral 1 indicates a conventional type of wheel used in motor vehicle construction and detachably mounted to a wheel bearing hub 2 by lugs 3 having removable nuts 4. The lugs 3 are carried by the usual annular flange 5 of the hub 2 and the latter carries the usual shield plate 6 for cooperation with a brake drum in preventing the entrance of foreign matter to the brake mechanism 7. The brake mechanism 7 is of the conventional type as shown in Figure 2, except that the brake shoes do not carry a lining as now customary in motor vehicle construction. The shoes 7 have their ends slightly curved, as shown at 8, to prevent them from biting into a brake lining which will be hereinafter more fully described. The shoes may be constructed of any material suitable for the purpose and if desired, may be provided with a facing.

While the wheel 1 is illustrated of the wire spoke type, my invention is just as readily applicable to other types of wheels now in use that are of the demountable type.

Figure 12:
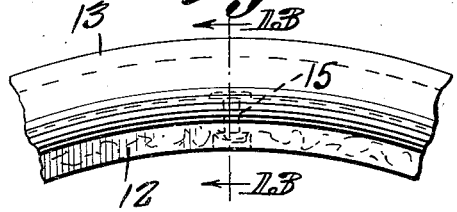
Figure 12 is a fragmentary side elevation showing the lining riveted to the drum.
Figure 13:
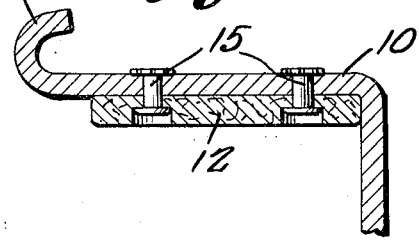
Figure 13 is a sectional view taken on the line 13—13 of Figure 12.

My invention resides in a demountable brake drum 9 and a brake lining therefor. The drum 9 is a separate unit from the wheel construction and the axle hub therefor and is easily removable from the hub 2 after the demounting of the wheel 1 without the employment of special tools or the necessity of disturbing the brake shoes, axle bearings and other associated parts of the motor vehicle construction. The drum 9 is provided with an annular bearing portion 10 and a side plate 11 apertured to receive the hub 2 and fit tightly against the flange 5 and also provided with apertures properly positioned to receive the lugs 3 prior to the application of the wheel 1 to said lugs. After the application of the wheel to the lugs and the nuts applied to the lugs, the drum 9 is firmly anchored in position to withstand all strain and stresses and be free of any back-lashing during the application of the brake. The annular portion 10 when the brake drum is applied to the hub 2 surrounds the brake shoes 7 and has in engagement therewith a brake lining 12 to be engaged by the brake shoes when the latter are moved into brake-applying position for the purpose of retarding the rotation of the wheel. The lining so positioned with respect to the drum and the brake shoes acts as a heat insulator to prevent the heat generated by the brake shoes from being transmitted to the drum and the wheel and thence to the other parts associated with said wheel. The free edge of the bearing portion 10 is bent to form an annular flange 13 spaced slightly from the guard plate 6. At spaced intervals the flange 13 may be offset, as shown at 14, to retain the lining 12 floatable within the drum or if desired, the lining may be secured to the drum by rivets or like fasteners 15 as shown in Figures 12 and 13.

Figure 6:
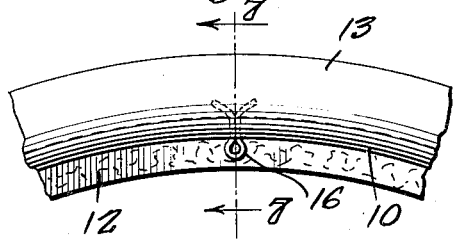
Figure 6 is a fragmentary side elevation showing another modified means of securing the lining to the drum.
Figure 7:
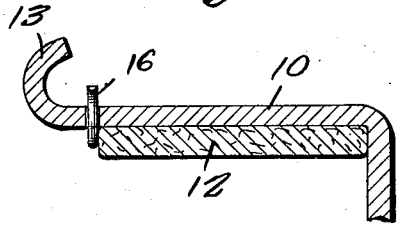
Figure 7 is a transverse sectional view taken on the line 7—7 of Figure 6.

As shown in Figures 6 and 7 the annular portion 10 of the brake drum may be provided at spaced intervals with apertures to receive cotter keys or like fasteners 16 for removably securing the lining to the drum by engaging one edge of the lining, while the opposite edge of the lining abuts the wall 11 of the drum.

Figure 8:
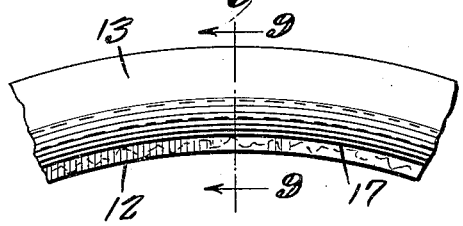
Figure 8 is a fragmentary side elevation illustrating another modified form of means of connecting the lining to the drum.
Figure 9:
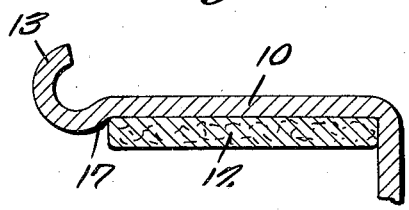
Figure 9 is a transverse sectional view taken on the line 9—9 of Figure 8.

As shown in Figures 8 and 9 the annular flange 13 may be offset to provide an annular bead 17 for retaining the lining in position.

Figure 10:
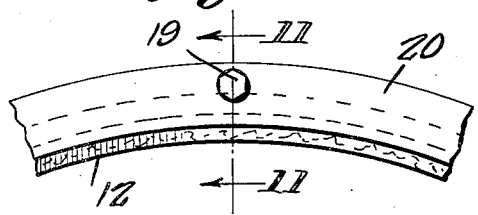
Figure 10 is a fragmentary side elevation illustrating a modified form of my invention in which the drum is provided with a removable plate to secure the lining in position.
Figure 11:
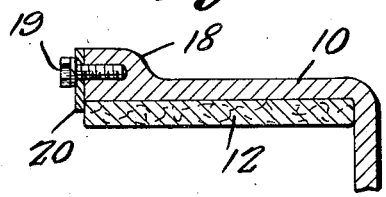
Figure 11 is a transverse sectional view taken on the line 11—11 of Figure 10.

As shown in Figures 10 and 11, the drum may be provided with a beading 18 at its free edge and provided at spaced intervals with screw threaded sockets to receive stud bolts 19 for detachably securing to the drum a ring-like member 20 engageable with one edge of the lining. As shown in Figure 14 the guard plate 6 may be employed for retaining the lining in the drum and as shown in Figure 15 an annular recess 21 may be formed in the bearing portion 10 of the drum to form a seat for the lining.

As shown in Figures 16 and 17 the annular bearing portion 10 of the drum, adjacent the flange 13, may be provided with removable and substantially U-shaped clips 22 for retaining the lining in position.

As shown in Figures 18 and 19 the annular bearing portion of the drum may be provided with an annular groove 23 forming a seat for a tension split ring 24 having offset ends 25 received in a slot or opening 26 of the drum. The split ring 24 is easily removable from the drum for the purpose of permitting the removal and application of the lining to the drum.

As shown in Figure 20, the lining may be constructed from a single length of material having its ends dove-tailed together, as shown at 27, or connected by tongues and notches as shown at 28 in Figure 21 or the lining when manufactured may be made of solid formation without detachable ends, as shown in Figure 22.

From the foregoing description taken in connection with the accompanying drawings it will be noted that a very efficient and practical brake mechanism is provided wherein the brake drum is demountable along with the removal of the demountable wheel so that necessary repairs or adjustments can be made to the brake shoes or bands and whereby the lining can be easily and conveniently renewed when necessary, consequently permitting a person to have the brake lining of his automobile renewed at a very nominal cost and within a very short period of time as a construction of this character will permit service to be standardized so that when a customer desires new brake lining it is only necessary that the wheels be removed, freeing the drums so that other drums carrying new linings can be substituted in lieu thereof. The lining may be detachably secured to the drum against movement relative thereto or the lining may be mounted in the drum so as to float relative thereto or have a rotary movement with respect to the drum when engaged by the brake shoes or bands. The brake lining being carried by the brake drum and revolving about the brake shoes will cause an even wearing of the brake lining and better braking action, overcoming the wearing of brake lining in spots as now frequent in an automotive construction.

While I have shown and described the preferred embodiment of my invention, it will be understood that minor changes in construction, combination and arrangement of parts may be made without departing from the spirit and scope of my invention, as claimed.

Having described the invention, I claim:

1. A brake drum comprising a drum element including an annular portion and an end wall apertured to receive an axle hub and provided with apertures to receive wheel lugs carried by the hub, an annular lining engageable with the annular portion of the drum element, and means removably and rotatably securing the lining to the drum element.

2. A brake drum comprising a drum element including an annular portion and an end wall apertured to receive an axle hub and provided with openings to receive wheel lugs carried by the hub, an annular lining engageable with the annular portion of the drum element, and means detachably connected to the drum element and cooperating with the end wall in removably and rotatably securing the lining to the drum element.

ARTHUR A. KOPF.